(12) United States Patent
Hsu et al.

(10) Patent No.: US 8,228,438 B2
(45) Date of Patent: Jul. 24, 2012

(54) IMAGE PROCESSING METHOD CAPABLE OF IMPROVING THE DISPLAY QUALITY OF IMAGE FRAMES

(75) Inventors: Ching-Fu Hsu, Fongyuan (TW); Chih-Chang Lai, Taiping (TW); Jyun-Sian Li, Tainan (TW)

(73) Assignee: Wintek Corporation, Taichung (TW)

( * ) Notice: Subject to any disclaimer, the term of this patent is extended or adjusted under 35 U.S.C. 154(b) by 347 days.

(21) Appl. No.: 12/635,363

(22) Filed: Dec. 10, 2009

(65) Prior Publication Data

US 2010/0225806 A1 Sep. 9, 2010

(30) Foreign Application Priority Data

Mar. 6, 2009 (TW) ................................ 98107454 A

(51) Int. Cl. *H04N 5/21* (2006.01)
(52) U.S. Cl. ........................................ 348/649
(58) Field of Classification Search .................. 348/663, 348/664, 666, 668, 725, 602, 630, 649–655; 382/167, 254, 274, 300; 345/581, 588, 600, 345/549, 690
See application file for complete search history.

(56) References Cited

U.S. PATENT DOCUMENTS

| | | | | |
|---|---|---|---|---|
| 4,567,507 A * | 1/1986 | Kusakabe et al. | ............. | 348/454 |
| 5,500,739 A * | 3/1996 | Strolle et al. | ................. | 386/308 |
| 5,621,537 A * | 4/1997 | Shibue et al. | ................. | 386/274 |
| 6,175,389 B1 * | 1/2001 | Felts et al. | ..................... | 348/663 |
| 6,958,784 B2 * | 10/2005 | Itani et al. | ..................... | 348/630 |
| 7,570,308 B2 | 8/2009 | Kim | | |
| 2007/0053587 A1 | 3/2007 | Ali | | |
| 2008/0002062 A1 * | 1/2008 | Kim et al. | ..................... | 348/602 |
| 2010/0097482 A1 * | 4/2010 | Kuniba | ..................... | 348/222.1 |

FOREIGN PATENT DOCUMENTS

| | | |
|---|---|---|
| CN | 1496131 | 5/2004 |
| CN | 1925582 | 3/2007 |
| CN | 101098489 | 1/2008 |

OTHER PUBLICATIONS

Chinese language office action dated Mar. 18, 2011.
English language translation of abstract of CN 1496131 (published May 12, 2004).
English language translation of abstract of CN 1925582 (published Mar. 7, 2007).
English language translation of abstract of CN 101098489 (published Jan. 2, 2008).

* cited by examiner

*Primary Examiner* — Paulos Natnael
(74) *Attorney, Agent, or Firm* — Thomas|Kayden

(57) ABSTRACT

An image processing method is provided. An image signal is received and correspondingly converted to an original luminance value, an original first chroma value and an original second chroma value. The original luminance value is adjusted to a modulated luminance value. The modulated luminance value is larger than the original luminance value as the original luminance value is larger than a threshold. The modulated luminance value is less than the original luminance value as the original luminance value is less than the threshold. The original first and second chroma values are linearly adjusted to a modulated first chroma value and a modulated second chroma value according to an original vector between the original first and second chroma values and a white point in a color gamut. The modulated luminance value, the modulated first chroma value and the modulated second chroma value are reconverted to a modulated image signal.

13 Claims, 4 Drawing Sheets

IMAGE PROCESSING METHOD CAPABLE OF IMPROVING THE DISPLAY QUALITY OF IMAGE FRAMES

This application claims the benefit of Taiwan application Serial No. 98107454, filed Mar. 6, 2009, the subject matter of which is incorporated herein by reference.

BACKGROUND OF THE INVENTION

1. Field of the Invention

The invention relates in general to an image processing method, and more particularly to an image processing method capable of improving the display quality of image frames.

2. Description of the Related Art

Along with the rapid development in 3G multi-media applications, viewing digital images with a 3G mobile phone or personal digital assistant (PDA) has become more and more popular. However, due to the low contrast of the images provided from the digital image sources such as a charge coupled device (CCD) or a mobile TV signal, the color tone of image frames shown on the screen of the mobile device may be too dark or too bright and result in brightness distortion.

SUMMARY OF THE INVENTION

The invention is directed to an image processing method for improving the display quality of image frame by enhancing the contrast and color vividness of the image.

According to a first aspect of the present invention, an image processing method is provided. The method includes the following steps. An image signal is received and correspondingly converted to an original luminance value, an original first chroma value and an original second chroma value. The original luminance values being inputted are further adjusted. The modulated luminance value is larger than the original luminance value as the original luminance value is larger than a threshold. The modulated luminance value is less than the original luminance value as the original luminance value is less than threshold. The original first chroma value and the original second chroma value are linearly adjusted to a modulated first chroma value and a modulated second chroma value according to a vector between the original first chroma value and the original second chroma value and a white point in a color gamut. The modulated luminance value, the modulated first chroma value and the modulated second chroma value are reconverted to a modulated image signal, and the modulated image signal is outputted.

The invention will become apparent from the following detailed description of the preferred but non-limiting embodiments. The following description is made with reference to the accompanying drawings.

DETAILED DESCRIPTION OF THE INVENTION

The invention provides an image processing method, the display quality of image frame is improved by enhancing the contrast and color vividness of image so that high quality display frame is achieved without distorting the image frame.

The invention provided an image processing method used in a display device such as but not limited to a mobile device. The method includes the following steps. An image signal is received and correspondingly converted to an original luminance value, an original first chroma value and an original second chroma value. The original luminance values being inputted are further adjusted. A modulated luminance value is larger than the original luminance value as the original luminance value is larger than a threshold. The modulated luminance value is less than the original luminance value as the original luminance value is less than threshold.

Then, the original first chroma value and the original second chroma value are linearly adjusted to a modulated first chroma value and a modulated second chroma value according to a vector between the original first chroma value and the original second chroma value and a white point in a color gamut. The modulated luminance value, the modulated first chroma value and the modulated second chroma value are reconverted to a modulated image signal, and the modulated image signal is outputted.

Figure 1A:
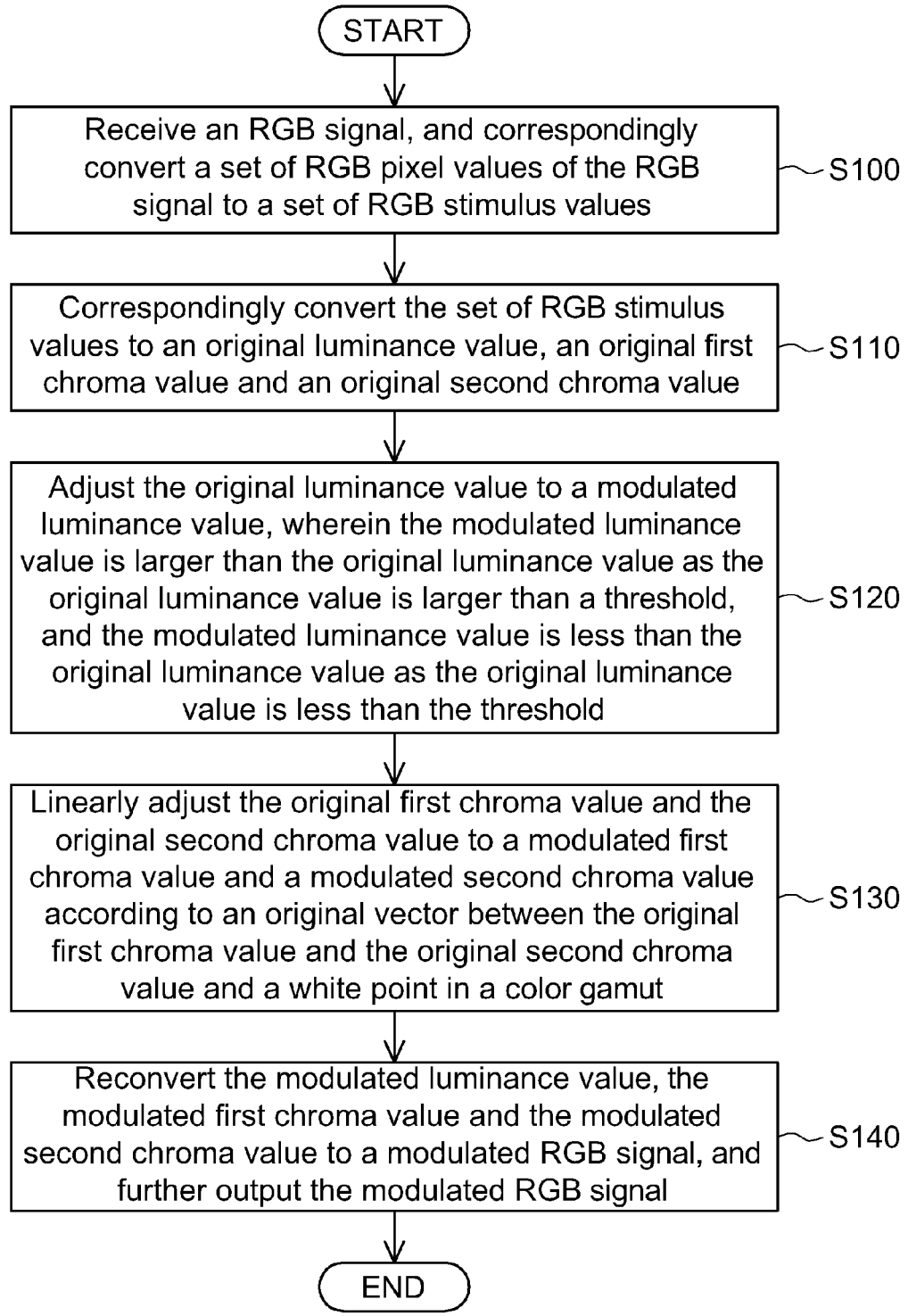
FIG. 1A shows a flowchart of an image processing method according to a preferred embodiment of the invention.
Figure 1B:
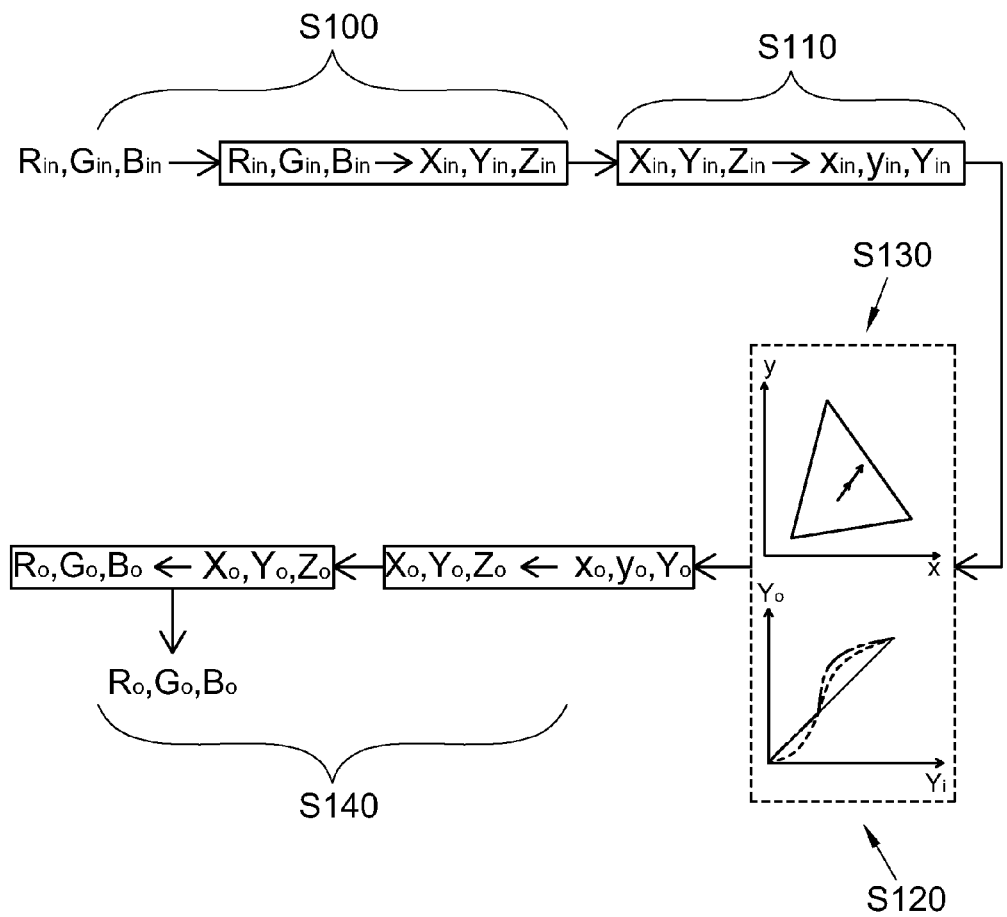
FIG. 1B shows a diagram of an image processing method according to a preferred embodiment of the invention.

Referring to FIG. 1A, a flowchart of an image processing method according to a preferred embodiment of the invention is shown. The image processing method substantially processes many pixels data, and each pixel datum presents an image signal. In the following exemplification, let the image signal be but not limited to an RGB signal. However, the image signal can also be a YUV signal. Referring to FIG. 1B, a diagram of an image processing method according to a preferred embodiment of the invention is shown. Each RGB signal has a set of RGB pixel values ($R_{in}$, $G_{in}$, $B_{in}$). In step S100, an RGB signal is received, and a set of RGB pixel values of the RGB signal is correspondingly converted to a set of RGB stimulus values (such as $X_{in}$, $Y_{in}$, $Z_{in}$ of FIG. 1B). According to the present invention, as image processing is instantaneously applied to each pixel data separately, no extra frame memory is needed during the overall calculation process.

In step S110, the set of RGB stimulus values is correspondingly converted to an original luminance value, an original first chroma value and an original second chroma value. The original luminance value, the original first chroma value and the original second chroma value may belong to a CIE xyY color space, a CIE LAB color space or a CIE LUV color space, and no specific restriction is imposed. The CIE LAB color space includes brightness information (L) and chroma information (A and B). In the following exemplification, let the original luminance value, the original first chroma value and the original second chroma value belong to the CIE xyY color space. That is, the RGB pixel values ($R_{in}$, $G_{in}$, $B_{in}$) of the RGB signal is correspondingly converted to the original luminance value $Y_{in}$, the original first chroma value $x_{in}$ and the original second chroma value $y_{in}$ of FIG. 1B.

Figure 2A:
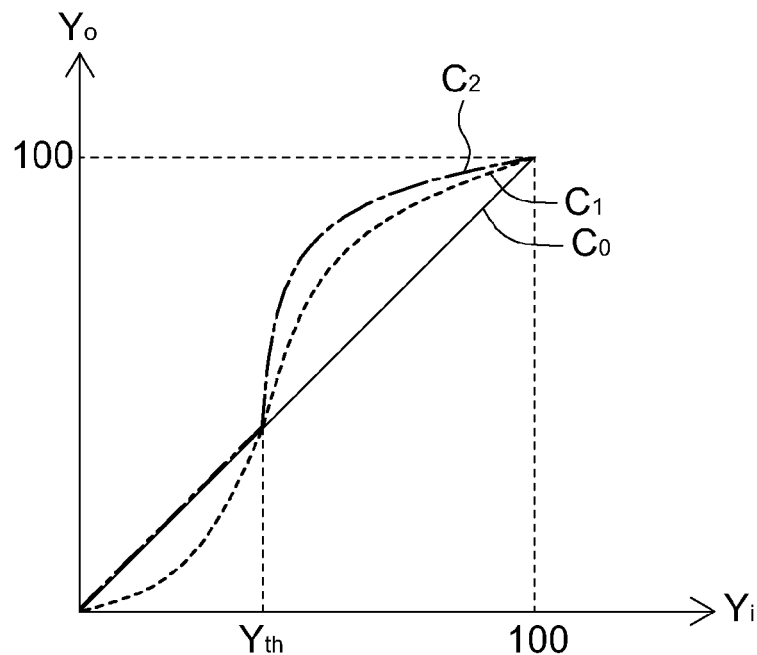
FIG. 2A and FIG. 2B show the adjustment of luminance value according to a preferred embodiment of the invention.
Figure 2B:
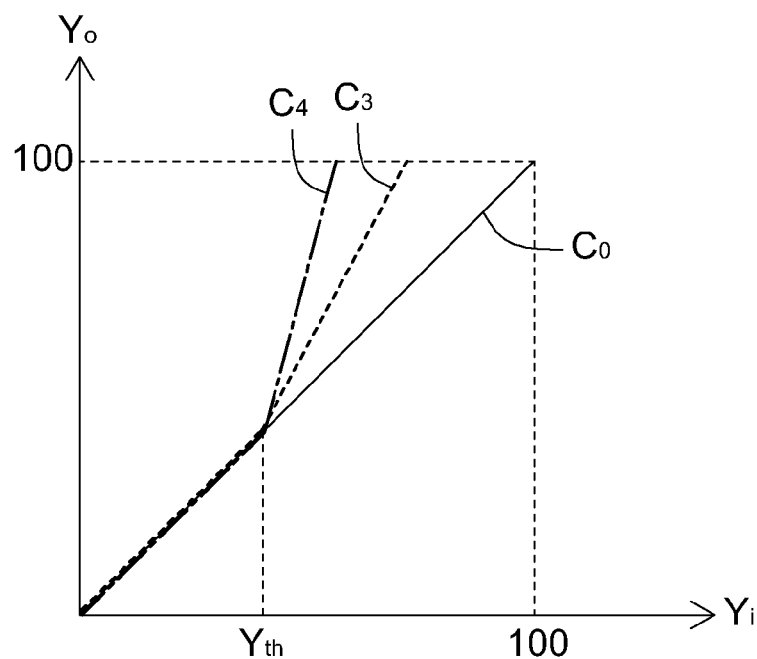

In step S120, the original luminance value $Y_{in}$ is adjusted to a modulated luminance value $Y_o$. The modulated luminance value $Y_o$ is larger than the original luminance value $Y_{in}$ as original luminance value $Y_{in}$ is larger than a threshold. The modulated luminance value $Y_o$ is less than the original luminance value $Y_{in}$ as the original luminance value $Y_{in}$ is less than the threshold. Referring to FIG. 2A and FIG. 2B, the adjustment of luminance value according to a preferred embodiment of the invention is shown. Step S120 substantially makes the luminance value of the bright state brighter and the luminance value of the dark state darker so as to enhance the contrast of image frame.

In FIG. 2A and FIG. 2B, to keep the original luminance value $Y_{in}$ unadjusted, then the original luminance value $Y_{in}$ is converted to the modulated luminance value $Y_o$ according to a conversion curve $C_0$ whose slope is 1. If the original luminance value $Y_{in}$ is to be adjusted, then the original luminance value $Y_{in}$ is converted to the modulated luminance value $Y_o$ according to different conversion curves such as but not limited to $C_1$~$C_4$.

As indicated in FIG. 2A and FIG. 2B, the modulated luminance value $Y_o$ is larger than the original luminance value $Y_{in}$ as the original luminance value $Y_{in}$ is larger than a threshold $Y_{th}$ and is adjusted according to the conversion curves $C_1$~$C_4$. The modulated luminance value $Y_o$ is less than the original luminance value $Y_{in}$ as the original luminance value $Y_{in}$ is less than a threshold $Y_{th}$ and is adjusted according to the conversion curve $C_1$. The modulated luminance value $Y_o$ is equal to the original luminance value $Y_{in}$ as the original luminance value $Y_{in}$ is less than the threshold $Y_{th}$ and is adjusted according to the conversion curve $C_2$~$C_4$. That is, the luminance values of bright state are adjusted to be even brighter, and the luminance values of the dark state can selectively remain unchanged.

Besides, an ambient light photo sensor (ALPS) can be appended to the display device applied in the invention for sensing the change in the ambient light. Thus, the conversion curve through which the original luminance value $Y_{in}$ is converted to the modulated luminance value $Y_o$ is determined according to the sensed change in the ambient light, so that the contrast of the image frame of the display device is more adaptable to the ambient light. For example, if the light sensing element senses that the ambient light is strong, this impels that the current image frame is in a dark state, then the conversion curve $C_4$ is selected for converting the original luminance value $Y_{in}$ to a modulated luminance value $Y_o$ to adjust the image frame to be brighter, but the dark part of the image frame is not selected, so as to enhance the image contrast. To the contrary, if the light sensing element senses that the ambient light is too weak, this impels that the current image frame is in a bright state or is suitable, then the conversion curve $C_3$ is selected for converting the original luminance value $Y_{in}$ to a modulated luminance value $Y_o$, so that the image frame is fine-tuned or not adjusted at all.

In step S130, the original first chroma value $x_{in}$ and the original second chroma value $y_{in}$ are linearly adjusted to a modulated first chroma value $x_o$ and a modulated second chroma value $y_o$ according to an original vector between the original first chroma value $x_{in}$ and the original second chroma value $y_{in}$ and a white point $(x_s, y_s)$ in a color gamut. The modulated first chroma value $x_o$ and the modulated second chroma value $y_o$ are within the color gamut range.

Figure 3:
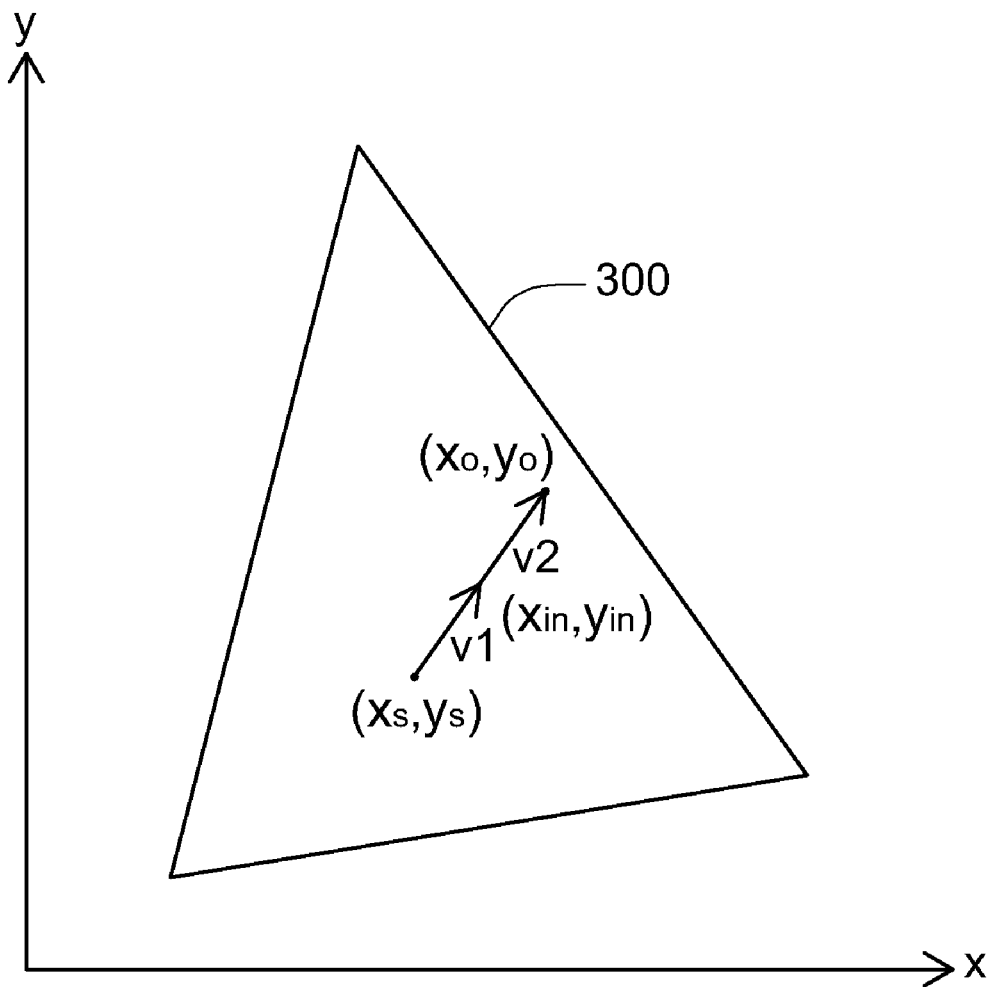
FIG. 3 shows the adjustment of chroma value according to a preferred embodiment of the invention.

Referring to FIG. 3, the adjustment of chroma value according to a preferred embodiment of the invention is shown. In the color gamut 300, there is an original vector $v_1$ between the original first chroma value $x_{in}$ and the original second chroma value $y_{in}$ and the white point $(x_s, y_s)$. The original first chroma value $X_{in}$ and the original second chroma value $y_{in}$, are linearly adjusted to a modulated first chroma value $x_o$ and the modulated second chroma value $y_o$ according to the original vector $v_1$ and a color purity (CP) corresponding to the RGB signal. The color purity is the difference between the maximum pixel value and the minimum pixel value among the RGB pixel values $(R_{in}, G_{in}, B_{in})$ of the RGB signal. The color purity is expressed in formula (1):

$$CP = \max(R_{in}, G_{in}, B_{in}) - \min(R_{in}, G_{in}, B_{in}) \tag{1}$$

In the color gamut 300, there is a modulated vector $v_2$ between the modulated first chroma value $x_o$ and the modulated second chroma value $y_o$ and the white point $(x_s, y_s)$. The modulated vector $v_2$ is k times of the original vector $v_1$, wherein k is lager than or equal to 1. Substantially, the smaller the color purity, the larger value of k, and the larger space for color enhancement. In the flowchart of the image processing method of the invention, the modulated first chroma value $x_o$ and the modulated second chroma value $y_o$ can be obtained according to the distance formulas as expressed in formula (2):

$$\sqrt{(x_o - x_s)^2 + (y_o - y_s)^2} = k\sqrt{(x_{in} - x_s)^2 + (y_{in} - y_s)^2} \tag{2}$$

The value of k is substantially determined according to the color purity of the RGB signal. By determining the range of color purity and inquiring a lookup table (LUT), different values of k are given according to different ranges of color purity, wherein the value of k is larger than or equal to 1. Besides, the value of k can be assigned as but not limited to about 1.6.

Besides, step S120 is substantially for adjusting the modulated luminance value of the RGB signal, and step S130 is substantially for adjusting the modulated chroma value of the RGB signal. In the present embodiment of the invention, step S120 and step S130 do not have to be executed in order, and can be exacted at the same time.

Afterwards, the method proceeds to step S140, the modulated luminance value $Y_o$, the modulated first chroma value $x_o$ and the modulated second chroma value $y_o$ are reconverted to the modulated RGB stimulus values (such as $X_o$, $Y_o$, $Z_o$ of FIG. 1B), and the modulated RGB stimulus values are reconverted to a set of RGB pixel values $(R_o, G_o, B_o)$ to obtain a modulated RGB signal, and further output the modulated RGB signal. Thus, the contrast and color vividness of the image frame of the display device are enhanced.

The image processing method disclosed in the above embodiment of the invention has many advantages exemplified below.

According to the image processing method of the invention, the pixel data with higher luminance values is made even brighter, or the pixel data with lower luminance values is made even darker. Also, a larger degree of color enhancement processing is done on the pixels with smaller color purity, and a smaller degree of color enhancement processing is done on the pixels with larger color purity. Thus, the image processing method of the invention effectively enhances the contrast and color vividness of the image frame, so as to achieve high display quality of the image frame without distortion, thereby improving the display quality of the image frame. According to the present invention, as image processing is instantaneously applied to each pixel data separately, no extra frame memory is needed during the overall calculation process. Thus, the invention has lower complexity in the hardware and effectively reduces the cost.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An image processing method, comprising:
   converting an image signal to an original luminance value, an original first chroma value and an original second chroma value;
   adjusting the original luminance value to a adjusted luminance value, wherein the adjusted luminance value is larger than the original luminance value as the original luminance value is larger than a threshold, and the adjusted luminance value is less than the original luminance value as the original luminance value is less than the threshold;

linearly adjusting the original first chroma value and the original second chroma value to a adjusted first chroma value and a adjusted second chroma value according to an original vector between the original first chroma value and the original second chroma value and a white point in a color gamut; and reconverting the adjusted luminance value, the adjusted first chroma value and the adjusted second chroma value to a adjusted image signal, and outputting the adjusted image signal.

2. The image processing method according to claim 1, wherein the image signal is a YUV signal.

3. The image processing method according to claim 1, wherein the image signal is an RGB signal.

4. The image processing method according to claim 3, further comprising:
converting a set of RGB pixel values of the RGB signal to a set of RGB stimulus values; and
converting the set of RGB stimulus values to the original luminance value, the original first chroma value and the original second chroma value.

5. The image processing method according to claim 1, wherein the original luminance value, the original first chroma value and the original second chroma value belong to a CIE xyY color space.

6. The image processing method according to claim 1, wherein the original luminance value, the original first chroma value and the original second chroma value belong to a CIE LAB color space.

7. The image processing method according to claim 1, wherein the original luminance value, the original first chroma value and the original second chroma value belong to a CIE LUV color space.

8. The image processing method according to claim 1, further comprising:
sensing change of ambient light by an ambient light photo sensor (ALPS), and accordingly adjusting the original luminance value to the adjusted luminance value.

9. The image processing method according to claim 1, wherein the adjusted first chroma value and the adjusted second chroma value are within the color gamut range.

10. The image processing method according to claim 1, further comprising:
linearly adjusting the original first chroma value and the original second chroma value to the adjusted first chroma value and the adjusted second chroma value according to the original vector and a color purity corresponding to the image signal.

11. The image processing method according to claim 10, wherein a adjusted vector between the adjusted first chroma value and the adjusted second chroma value and the white point in the color gamut is k times of the original vector, k is larger than or equal to 1.

12. The image processing method according to claim 11, wherein the smaller the color purity, the larger the value of k.

13. The image processing method according to claim 10, wherein the image signal is an RGB signal with a set of RGB pixel values, and the color purity is a difference between a maximum pixel value and a minimum pixel value of the set of RGB pixel values.

* * * * *